United States Patent
Yadav et al.

(10) Patent No.: US 11,995,869 B2
(45) Date of Patent: May 28, 2024

(54) SYSTEM AND METHOD TO IMPROVE OBJECT DETECTION ACCURACY BY FOCUS BRACKETING

(71) Applicant: Johnson Controls Tyco IP Holdings LLP, Milwaukee, WI (US)

(72) Inventors: Sourabh Singh Yadav, Khargone (IN); Rajkiran Kumar Gottumukkal, Bangaluru (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 204 days.

(21) Appl. No.: 17/488,103

(22) Filed: Sep. 28, 2021

(65) Prior Publication Data

US 2023/0098110 A1    Mar. 30, 2023

(51) Int. Cl.
G06T 7/00 (2017.01)
H04N 23/67 (2023.01)

(52) U.S. Cl.
CPC ............ *G06T 7/97* (2017.01); *H04N 23/676* (2023.01); *G06T 2207/20221* (2013.01)

(58) Field of Classification Search
CPC ... G06T 7/97; G06T 2207/20221; G06T 7/11; G06T 2207/10016; G06T 2207/10148; G06T 2207/30196; G06T 2207/30232; G06T 2207/30242; H04N 23/676; G06V 10/14; G06V 20/52; G06V 40/103; G06V 40/13
See application file for complete search history.

(56) References Cited

U.S. PATENT DOCUMENTS

| | | | | |
|---|---|---|---|---|
| 5,760,884 A | * | 6/1998 | Yahashi | G01C 3/08 356/3.16 |
| 7,113,616 B2 | * | 9/2006 | Ito | G08B 13/19602 382/103 |
| 8,983,131 B2 | * | 3/2015 | Hugosson | G06T 7/194 382/103 |
| 9,082,029 B2 | * | 7/2015 | Hammer | G06K 7/10732 |
| 9,519,972 B2 | * | 12/2016 | Venkataraman | G06T 1/20 |

(Continued)

FOREIGN PATENT DOCUMENTS

| | | | |
|---|---|---|---|
| EP | 3428616 A1 | 1/2019 | |
| WO | 2011088091 A1 | 7/2011 | |
| WO | WO-2019147024 A1 * | 8/2019 | ............ G06T 7/174 |

OTHER PUBLICATIONS

Cao et al., "Counting People by Using a Single Camera without Calibration," 28th Chinese Control and Decision Conference (CCDC), May 2016, pp. 2048-2051.

(Continued)

*Primary Examiner* — Edward F Urban
*Assistant Examiner* — Benedict E Lee
(74) *Attorney, Agent, or Firm* — ArentFox Schiff LLP

(57) ABSTRACT

Apparatus and methods for detecting an object in an image. One aspect of the method includes receiving a first image from an image sensor. The first image is obtained by the image sensor using a first focal length. A second image is received from the image sensor. The second image is obtained by the image sensor using a second focal length. One or more objects are detected in the first image and the second image. The one or more objects detected in the first image are combined with the one or more objects detected in the second image.

20 Claims, 7 Drawing Sheets

(56) References Cited

U.S. PATENT DOCUMENTS

| | | | |
|---|---|---|---|
| 9,870,521 B1* | 1/2018 | Solh | G06T 3/40 |
| 2022/0067909 A1* | 3/2022 | Edpalm | G06V 10/44 |
| 2022/0415066 A1* | 12/2022 | Hall | H04N 23/67 |

OTHER PUBLICATIONS

Invitation to pay additional fees and, where applicable, protest fee in PCT/US2022/076801, dated Jan. 13, 2023, 20 pages.

Pizzo et al., "Counting people by RGB or depth overhead cameras," Pattern Recognition Letters, Jun. 2016, vol. 81, pp. 41-50.

Vicente et al., "Embedded Vision Modules for Tracking and Counting People," IEEE Transaction on Instrumentation and Measurement, Sep. 2009, vol. 58, No. 9, pp. 3004-3011.

\* cited by examiner

SYSTEM AND METHOD TO IMPROVE OBJECT DETECTION ACCURACY BY FOCUS BRACKETING

TECHNICAL FIELD

The present disclosure generally relates to video analytics, and more specifically, to a system and method to improve object detection accuracy by focus bracketing.

BACKGROUND

Detection and tracking of objects is an aspect in the surveillance, healthcare, retail and transportation domains. Objects of interest could be, for example, humans, animals, vehicles, packages, and the like. Recognition of such objects in images and video is an important step in numerous applications, including but not limited to automated video/image search, automated visual surveillance, robotics, and the like. Conventional camera infrastructure typically provides low resolution imagery and thus can pose a challenging problem for object detection. The detection problem can further be exacerbated when the object of interest is only partially visible either due to occlusion by static scene structures or occlusion by other objects.

Generally, object detection is a challenging task for computers, since multi-class recognition and accurate localization should be performed simultaneously. Conventional approaches separate these two tasks, meaning that a large number of candidate object locations (often called "proposals" or "region proposals") must be processed before classifying the object category on each proposal.

Presently, object detection frameworks continue to struggle with detecting small objects, especially those bunched together with partial occlusions. Real-time detection with top-level classification and localization accuracy remains challenging, and designers of video analytics systems often prioritize one or the other when making design decisions. A conventional object detection system can use a neural convolution network (CNN) that provides coverage values and bounding boxes for a raster of spatial element regions or regions of spatial elements of the image. Each coverage value may represent a probability that an object is at least partially represented in a corresponding spatial element region, and the bounding box may be provided around the object for the spatial element region. Because objects can occupy multiple spatial element regions of the grid, different coverage values and bounding box acquisitions can correspond to the same object.

In view of the foregoing, there is a need for a more accurate approach to performing object detection.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

The present disclosure relates to a video analytics system utilizing an imaging device that has a focus bracket capturing function capable of capturing a plurality of images at different focus positions. Aspects of the present disclosure employ a masking operation to mask the regions for detection of the object of the same instance in an image scene and the subsequent application of said masked regions from one image to many subsequent images, including images at different focus positions.

One example implementation relates to a method for detecting an object in an image. An aspect of the method includes receiving a first image from an image sensor. The first image is obtained by the image sensor using a first focal length. A second image is received from the image sensor. The second image is obtained by the image sensor using a second focal length. One or more objects are detected in the first image and the second image. The one or more objects detected in the first image are combined with the one or more objects detected in the second image.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

Figure 1:
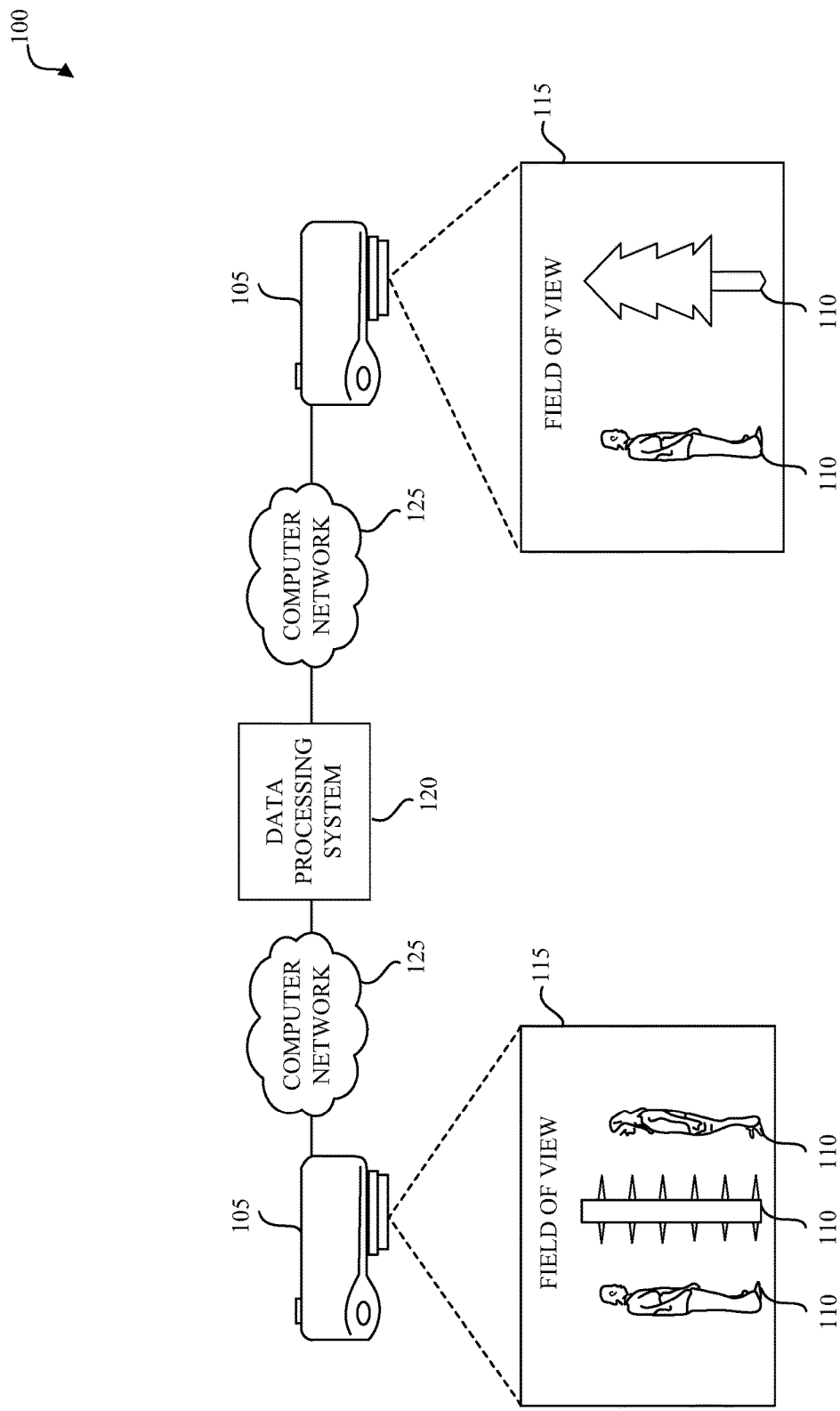
FIG. 1 is a functional diagram depicting an example environment for object detection, according to one aspect of the present disclosure.

As noted above, conventional object detection frameworks continue to struggle with detecting small objects, especially those bunched together with partial occlusions. Typically, various known deep learning based or CNN based single stage networks fail to address this problem due to the use of anchor boxes and non-maximal suppression methods to select the detection boxes. In these single stage networks location or position data can represent any number of position coordinates that define a detected object region, such as four coordinates that correspond to the corners of a bounding box region. The position coordinates can be specified in various possible formats, such as left, lower, upper and right coordinates. Another example of a format includes center coordinates (e.g. x, y) and the width and height of the spatial element region. In some examples, the location data can be provided using anchor boxes.

For example, there are two commonly observed implementations of Non-Maximum Suppression (NMS) algorithm: greedy NMS and optimal NMS. In case of a greedy NMS, NMS grouping by itself is particularly suited for single frame detections, but NMS grouping suffers from poor temporal consistency in which group locations appear jittery and lacking in smooth movement. NMS algorithm can be performed by ranking all the candidate regions based on their similarity scores in order (e.g., descending or ascending) and iterating through all the candidate regions from the top down. Given a candidate region, all the candidate regions that have a lower score and larger than a threshold measure of overlap (such as an intersection over union (IOU) which is larger than a threshold IOU) are removed. IOU is defined as the area of overlap of two regions divided by the union of their areas (areas can be measured in terms of number of pixels). The selected NMS threshold may be application-dependent and can be cross-validated for performance, although thresholds of IOU from about 0.1 to about 0.3 have been found to work well in practice. The greedy NMS (and its variants) follow one implicit hypothesis that detection boxes with high overlaps correspond to the same object and thus need to be grouped and reduced to one box. This assumption works reasonably well in general human/object detection, however, this assumption does not work well in top view where the multiple objects will be bound in the same bounding box. Adjusting the NMS threshold does not necessarily fix this problem.

Other known methods, like adaptive anchor boxes and double detection methods, are very susceptible to outliers. Although at least some anchor-free methods, such as CenterBox, can eliminate IoU-based NMS in the traditional sense, a local maximum typically needs to be selected in the predicted center heatmap via two dimensional (2d) max-pooling. NMS is a rescoring technique comprising of two main tasks: "matching loss" that penalizes superfluous detections and "joint processing" of neighbors to know if there is a better detection close-by. In essence, the anchor free methods can also be seen as NMS, but instead of depending on IoU, they are center-based methods.

One deep learning approach, region-based convolutional neural networks (RCNN), combines rectangular region proposals with convolutional neural network features. RCNN is a two-stage detection algorithm. The first stage identifies a subset of regions in an image that might contain an object. The second stage classifies the object in each region. Models for object detection using regions with CNNs are based on the following three processes: (a) find regions in the image that might contain an object (these regions are called region proposals); (b) extract CNN features from the region proposals; and (c) classify the objects using the extracted features. Faster RCNN adds a region proposal network to generate region proposals directly in the network. The region proposal network uses anchor boxes for object detection. Generally, generating region proposals in the network allows faster and more efficient detection of cells in sample images. It should be noted that two-stage networks, like faster RCNN, instance detection and mask RCNN, tend to determine the exact segmentation of each instance for a given object. However, these methods are prone to produce false negatives in case of occluded objects in top view. Furthermore, these methods are computationally expensive that cannot be used effectively on edge devices for real-time monitoring and surveillance.

Figure 2:
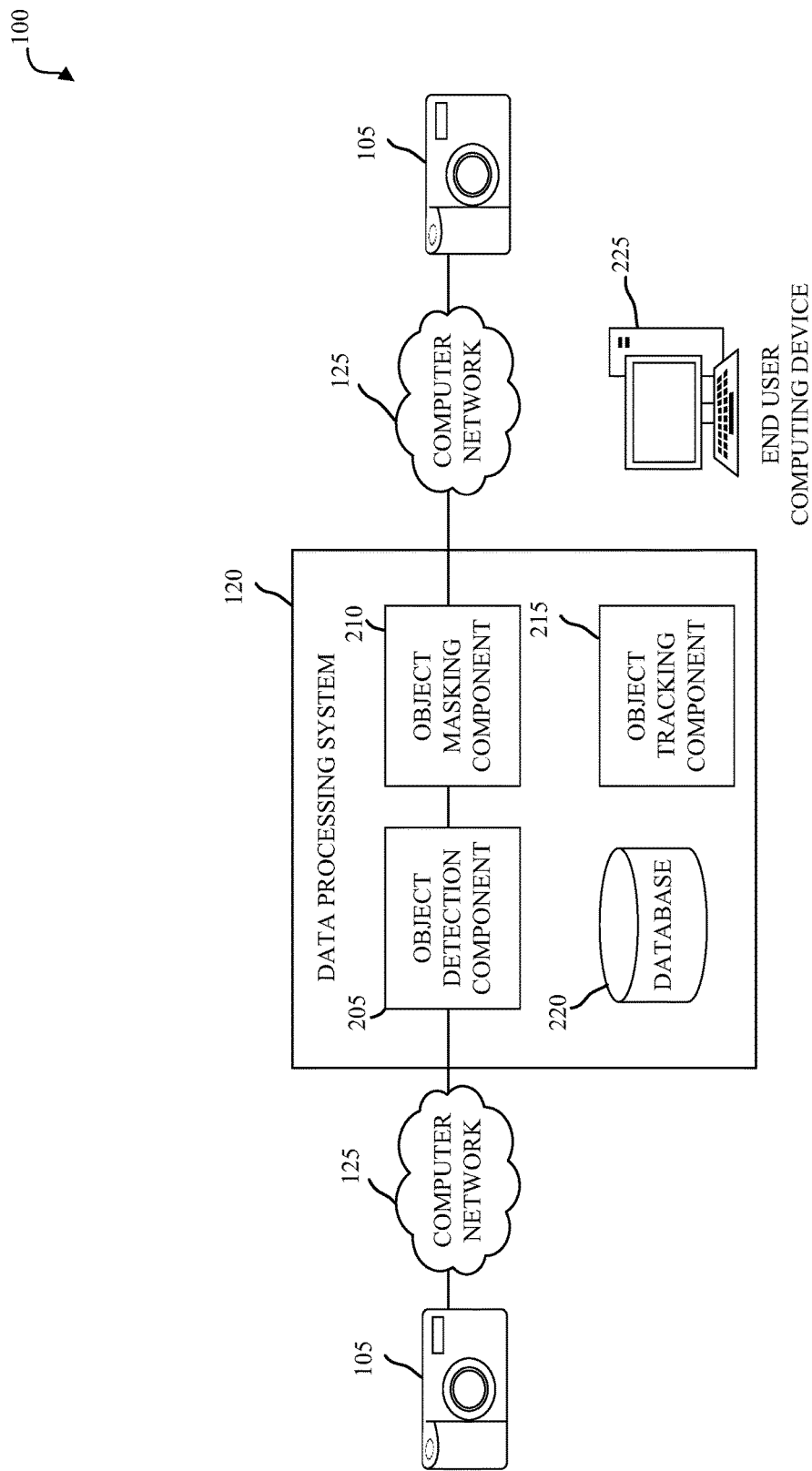
FIG. 2 is a block diagram depicting an example environment for object detection, according to one aspect of the present disclosure.

FIG. 1 and FIG. 2 illustrate an example system 100 of object detection across a plurality of images at different focus lengths. Referring to FIG. 1 and FIG. 2, among others, the video analytics system 100 can be part of an object detection or tracking system that, for example, identifies or tracks at least one object that appears in multiple different video images or still images. The object detection or tracking system can also count detected objects. The system 100 can include at least one image sensor 105, such as a video camera, surveillance camera, still image camera, digital camera, or other computing device with video or still image creation and/or recording capability.

In one aspect, the image sensor 105 has a focus bracket function for capturing a video, changing a focus length, and selecting one frame image from a plurality of frame images constituting a captured video. In one aspect, with the focus bracket function, a 4 k video-image having about 4000 times 2000 pixels is recorded.

Specifically, in the focus bracket function, a video capturing is performed with a focus lens being moved from a near-field focus toward a far-field focus. In one aspect, the image sensor 105 may select a frame image from a plurality of frame images constituting the video, based on assignment by the user, and cuts out and records the selected frame image as a still image. Accordingly, a high quality still image which is focused on a selected object (a region) can be obtained.

The objects 110 present in the video images or still images can include background objects or transient objects. The background objects 110 can include generally static or permanent objects that remain in position within the image. For example, the image sensors 105 can be present in a department store and the images created by the image sensors 105 can include background objects 110 such as clothing racks, tables, shelves, walls, floors, fixtures, goods, or other items that generally remain in a fixed location unless disturbed. In an outdoor setting, the images can include, among other things, background objects such as streets, buildings, sidewalks, utility structures, or parked cars. Transient objects 110 can include people, shopping carts, pets, or other objects (e.g., cars, vans, trucks, bicycles, or animals) that can move within or through the field of view of the image sensor 105.

The image sensors 105 can be placed in a variety of public and/or private locations and can generate or record digital images of background or transient objects 110 present within the fields of view of the image sensors 105. For example, a building can have multiple image sensors 105 in different areas of the building, such as different floors, different rooms, different areas of the same room, or surrounding outdoor space. The images recorded by the different image sensors 105 of their respective fields of view can include the same or different transient objects 110. For example, a first image (recorded by a first image sensor 105) can include a person (e.g., a transient object 110) passing through the field of view of the first image sensor 105 in a first area of a store. A second image (recorded by a second image sensor 105)

can include the same person or a different person (e.g., a transient object 110) passing through the field of view of the second image sensor 105 in a second area of a store. This second area could be overlapping with the first area and/or could be a completely separate area of a store.

The images, which can be video, digital, photographs, film, still, color, black and white, or combinations thereof, can be generated by different image sensors 105 that have different fields of view 115, or by the same image sensor 105 at different focal lengths. The field of view 115 of an image sensor 105 is generally the area through which a detector or sensor of the image sensor 105 can detect light or other electromagnetic radiation to generate an image. For example, the field of view 115 of the image sensor 105 can include the area (or volume) visible in the video or still image when displayed on a display of a computing device. The different fields of view 115 of different image sensors 105 can partially overlap or can be entirely separate from each other.

The system 100 can include a data processing system 120. The data processing system 120 can include at least one logic device such as a computing device or server having at least one processor to communicate via at least one computer network 125, for example with the image sensors 105. The computer network 125 can include computer networks such as the internet, local, wide, metro, private, virtual private, or other area networks, intranets, satellite networks, other computer networks such as voice or data mobile phone communication networks, and combinations thereof.

The data processing system 120 can include at least one server or other hardware. For example, the data processing system 120 can include a plurality of servers located in at least one data center or server farm. The data processing system 120 can detect, track, or count various objects 110 that are present in images created by one or more image sensors 105. The data processing system 120 can further include personal computing devices, desktop, laptop, tablet, mobile, smartphone, or other computing devices. The data processing system 120 can create documents indicating count of objects 110, characteristics of objects 110, or other information about objects 110 present in the images.

The data processing system 120 can include at least one object detection component 205, at least one object masking component 210, at least one object tracking component 215, and/or at least one database 220. The object detection component 205, object masking component 210, object tracking component 215 can each include at least one processing unit, appliance, server, virtual server, circuit, engine, agent, or other logic device such as programmable logic arrays, hardware, software, or hardware and software combinations configured to communicate with the database 220 and with other computing devices (e.g., the image sensors 105, end user computing devices 225 or other computing device) via the computer network 125. The data processing system 120 can be or include a hardware system having at least one processor and memory unit and including the object detection component 205, object masking component 210, and object tracking component 215.

Figure 3:
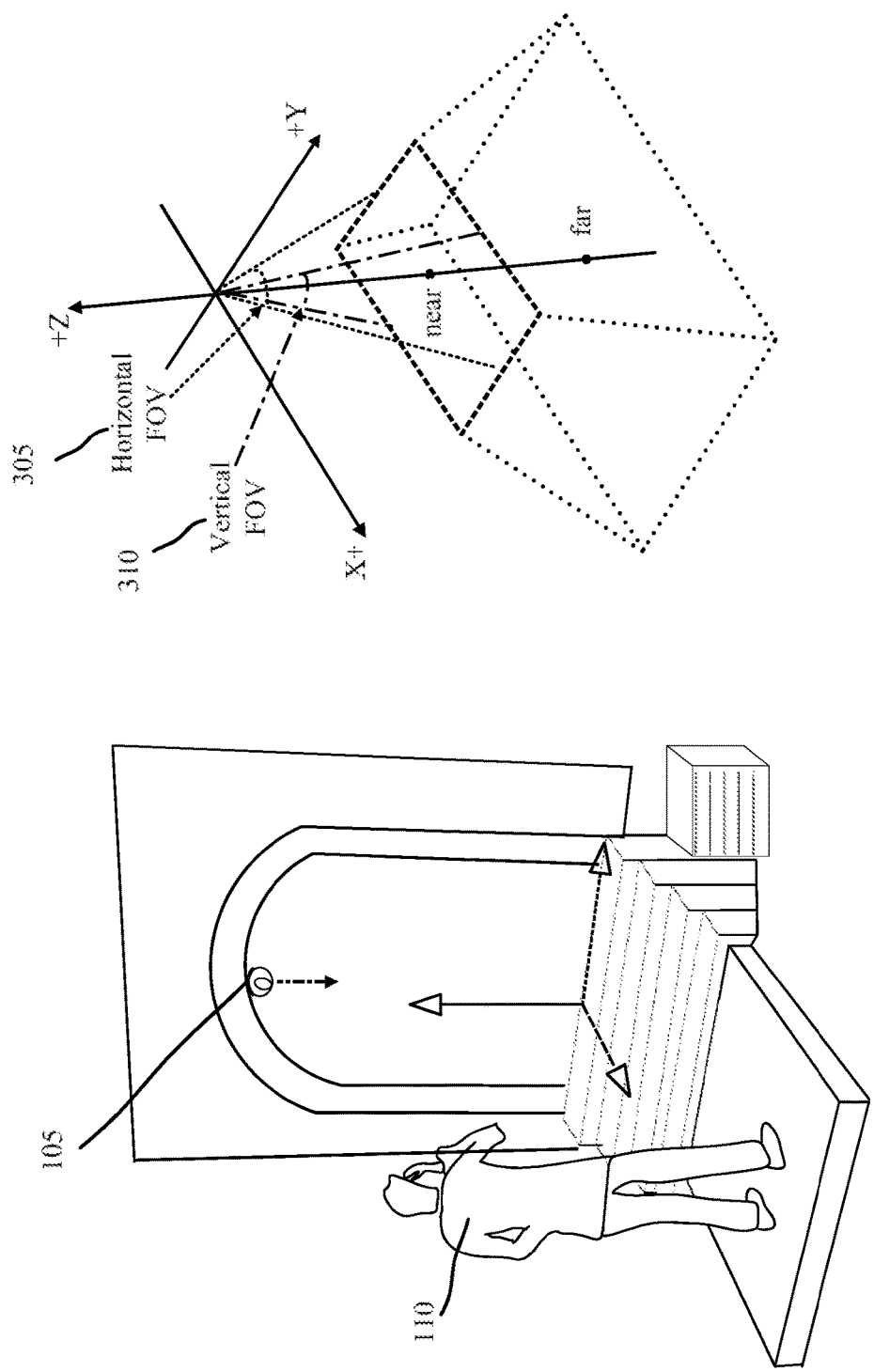
FIG. 3 illustrates a technique that may be used to create a virtual fence, for example, to be used for counting people entering and leaving a space, according to one aspect of the present disclosure.

One of the applications of video analytics is to count number of people entering and leaving a building. FIG. 3 illustrates a technique that may be used to create a virtual fence, for example, to be used for counting people entering and leaving a space. A typical virtual fence is a line superimposed over an image captured by an image sensor 105. An event may be triggered when the video analytics system 100 detects an object of interest 110 crossing the virtual fence. For example, the image sensor 105 may be positioned to capture images of a street in front of a sidewalk. A virtual fence may be drawn across the sidewalk, and an event would be triggered when an object of interest 110, such as a person, walks along the sidewalk and crosses the fence. In an aspect, the video analytics system 100 may be configured to count number of people crossing the virtual fence in both directions.

The object detection component 205 and the object tracking component 215 collectively detect the objects crossing the virtual fence into any number of predetermined categories of objects. For example, some categories of interest may include, but are not limited to a person, vehicle, animal. The detection techniques that can be used are what are known as the Histogram of Oriented Gradients (HOG) for detection of objects, using deep learned techniques, or other suitable techniques or combinations of techniques. In an aspect, the detection component 205 may utilize a detection threshold. The detection threshold may be adjusted depending on the size of the object. The detection threshold is the threshold score an object should have to be classified as a person (or other selected object category). This detection score is dependent on the size of the object (bigger objects get higher scores). In an aspect, to improve accuracy of object detection, the image sensor 105 may be configured for obtaining the top-view image, as shown in FIG. 3.

In an aspect, image calibration of the image sensor 105 may be performed prior to obtaining any images. The image calibration enables accurate determination of angles, positions, and lengths in captured images without the use of multiple sensor devices or multiple positions for a single image sensor 105. In the top-view image, the perpendicular depth from the image sensor 105 and ground can be calculated during calibration. Image calibration defines the relationship between an image and the scene that the image depicts. Calibration characterizes the photometric and geometric properties of the image sensor 105, that define, respectively how pixels of the image sensor 105 report color and intensity of the scene, and where scene elements appear on the image. Most common calibration approaches start with an image of an object with known 3-D geometry, or several images of an object with known 2-D geometry, find correspondences between points on the object and points in the image, and use these to solve for the image sensor geometry. Calibration allows to exploit the depth of the image for adjusting focus of the image sensor 105.

Image sensor 105 calibration can be used in the video analytics process for the purposes of identifying the position of the object of interest 110 in the three-dimensional space, which in turn is used in the process of verification of objects of interest 110 (for example, determining whether the object in the position A (x, y) is the same object which after changing the field of view is visible in the point B (x1, y1).

In case of vast space surveillance image sensors (for, example having surveillance radius 5-20 km from the image sensor 105) for the sake of simplification examination of the identity of objects in the two-dimensional plane of the image x-y is assumed. Due to optical errors of image sensors, the movement of cameras along the horizontal and vertical axis, the change of the focus of the image sensor 105, as well as well-known phenomena connected with planar transformations, divergences occur between the observed position of the object of interest 110 in the plane of the screen x-y and the expected location, resulting from the angle of rotation in the horizontal and vertical axis. Finding these divergences and taking them into account in the object verification process is of key importance for the correct verification of the objects of interest 110.

FIG. 3 further illustrates that image sensor 105 may be configured to have any suitable field of view (FOV). In one particular example, image sensor 105 may have a horizontal FOV 305 of 90 degrees and a vertical FOV 310 of 60 degrees.

When an image is taken, such as with the image sensor 105, one or more regions in the image may be out of focus, because of different distances from the lens of the image sensor 105, for example. This is true even with the image sensor 105 having an auto-focus function. Post-capture refocusing of an image to produce a refocused image is sometimes desirable.

Features as described herein may use focus as a cue, and apply an image matting technique for region segmentation to generate refocus images. The matting based region segmentation can give an alpha map of the region in which percentage of the foreground/background is calculated. Also, features may be used to generate an artificial Bokeh, where the focus region and other regions are filtered differently. This approach may be fully automatic. Different refocused images may be generated without any user input. Another example of filtering focus regions and other regions differently is to apply a motion blur filter on out-of-focus region(s) such that a background motion effect can be artificially generated. Yet another example of filtering focus regions and other regions differently is to remove the color of out-of-focus region(s) such that emphasis of colorful focus region with a grey-scale background effect can be artificially generated. There are various other applications for applying filters differently on different regions. In an aspect, image calibration parameters can be used to adjust the depth-of-field or focus regions to acquire multiple images of the scene which highlights the regions based on distance from the image sensor 105.

According to certain aspects, using the image information obtained from the image sensor 105, various computational processes can be applied to the image information to modify and produce images with varied characteristics. Examples include producing 2D or 3D images, depth of focus changes for still images as well as for motion pictures (series of images), adjusting focus points in images, changing angles or creating new views, selectively focusing on near field or far field separately or simultaneously. It should be appreciated that the image processing methodologies described herein may be performed offline after image capture, or they may be performed in real time as images are being captured. In other words, the image sensor 105 can obtain images from both near field focus and far field focus. The near field focus image and far field focus image can be analyzed to detect a number of objects in each image. Furthermore, the analyzed information can be combined, for example, to count people entering and/or leaving a space.

Figure 4:
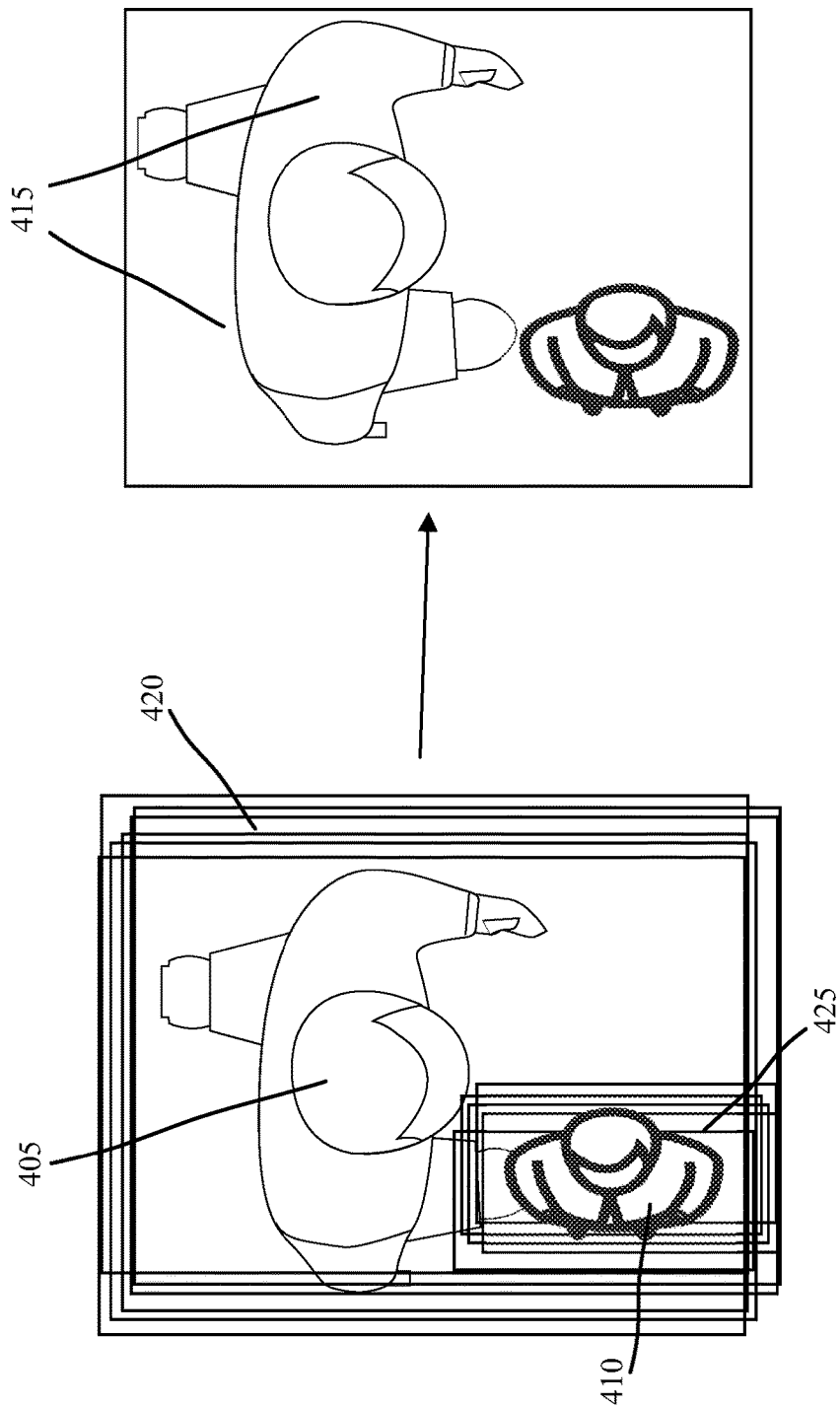
FIG. 4 is an example of a multi-frame analysis where multiple frames are obtained from focal bracketing, according to an aspect of the present disclosure.

FIG. 4 is an example of a multi-frame analysis where multiple frames are obtained from focal bracketing, according to one aspect of the present disclosure. In some aspects, the image sensor 105 may include an autofocus module. Instructions in the autofocus module can determine the lens position information. The lens position information may include a current lens position, a target lens position, and an autofocus search operation direction determination. In some aspects, instructions in the autofocus module may represent means for initializing an autofocus search operation. In some aspects, instructions in the autofocus module may represent means for determining a magnitude and/or direction of lens movement for an autofocus search operation. When an autofocus operation is triggered and when the autofocus module has affected and concluded an autofocus operation, the lens parameters corresponding to that autofocus operation can be determined. The lens parameters can include focusing distance, lens focal length and lens aperture. The processor may be configured to focus the lens on the object of interest 110 at a first instance of time. In an aspect, the image sensor 105 can use multiple frames for detecting the object of interest 110 in focus while masking out the objects which are out of focus.

In one example, the object detection component 205 can detect edges as a feature from the plurality of input images, and can further detect which object from among the plurality of input images is in-focus at the first focal length. In an aspect, the object detection component 205 can detect the objects which are in focus in near field focus image. For example, if the image shown in FIG. 4 depicts an adult and a child, at first focal length the object detection component 205 can detect the adult 405 in near field focus image. Then the object masking component 210 can mask this detected object at the second focal length (in the far field focus image). In one aspect, after obtaining the far field focus image at a second focal length and masking out the objects detected at the first focal length (such as the adult 405 in FIG. 4) the object detection component 205 can be configured to detect the remaining objects. Still referring to FIG. 4, the object detection component 205 can detect the child 410 in the far field focus image. By combining these detections the object detection component 205 can detect all the objects in the image shown in FIG. 4.

The data processing system 120 can be used to control aspects of operation of the image sensor 105. Various control options can be implemented for the image sensor 105. Operation can be configured for automatic control selecting Regions of Interest (ROIs) based on operating algorithms such as face recognition, motion detecting, event detection, or other implemented parameters. Control from the data processing system 120 can be automatic or manual, with the ability to adjust image quality parameters, or otherwise adjust and manipulate the image. Control can essentially be automatic within the image sensor 105 with adjustments or overrides performed by the data processing system 120.

Figure 5:
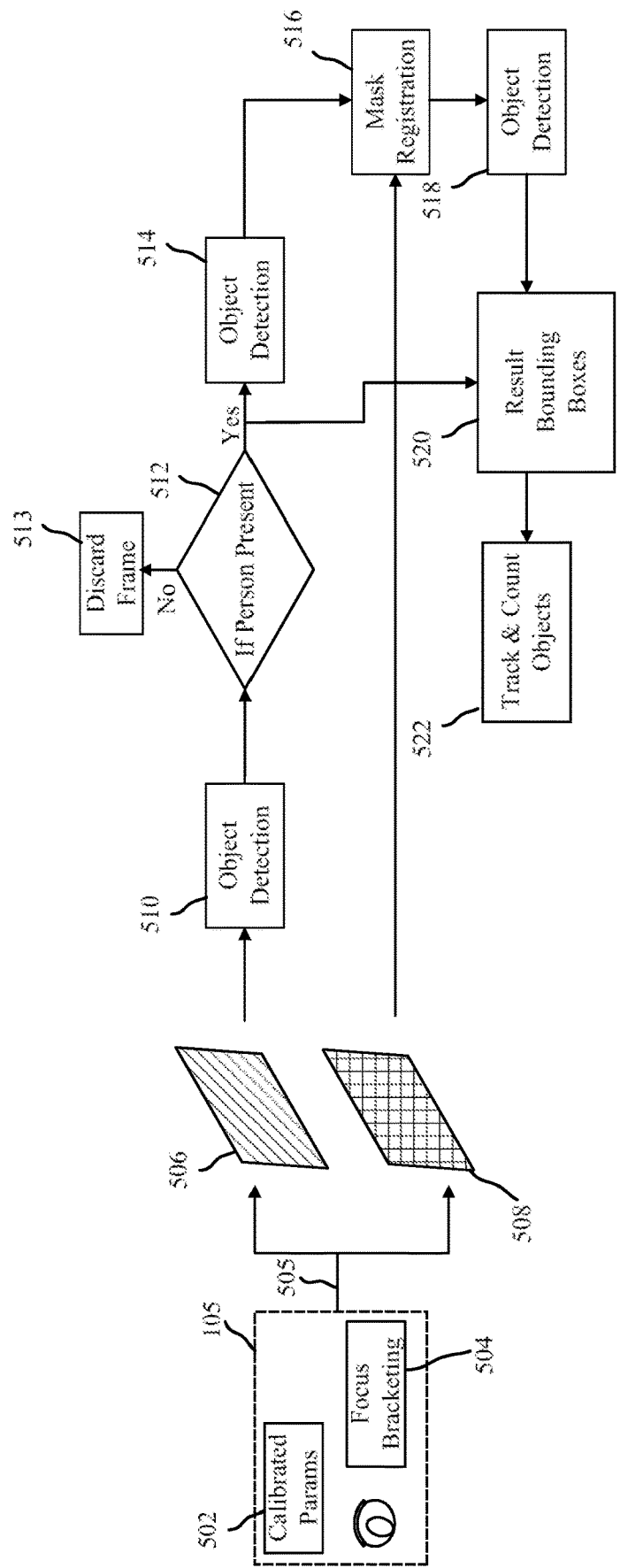
FIG. 5 is an example of a flow diagram of a method of using near field and far field images for tracking and counting objects, according to an aspect of the present disclosure.

FIG. 5 is an example of a flow diagram of a method of using near field and far field images for tracking and counting objects, according to an aspect of the present disclosure. The disclosed method can be performed using a calibrated image sensor 105 that has a focus bracket capturing function 504 capable of capturing by one operation a plurality of images at different focus positions. As noted above, in an aspect, image calibration parameters 502 can be used to adjust the depth-of-field or focus regions or depth thresholding to acquire multiple images of the scene which highlights the focus regions based on distance from the image sensor 105.

Specifically, focus bracketing 504 is an image capturing method for obtaining a plurality of images focused at different distances by capturing an image multiple times while changing the focus distance so that a proximal subject, an intermediate subject, and a distal subject sequentially come into focus, for example. During focus bracketing 504, the f-number of the lens is usually set to be small (as compared to the far-field) at the time of near field image capturing. This setting makes each near field image 506 have a shallow depth of field but makes the amount of incident light for forming the image large, yielding a sharp image having relatively less image capturing noise than a far field image 508 captured with a large f-number. Notably, the system 100 can utilize a single image sensor 105 to generate focus bracketed image data, rather than having multiple image sensors for image capture. In an aspect, at 505, the image sensor 105 can generate multiple images of the given scene with the use of focal or depth-of-field bracketing to capture near field focus image 506 and far field focus images 508.

If the near field focused image 506 captures a human object of interest 110 (e.g., a person), then the image sensor 105 can focus on head and shoulder region 415 of the object of interest 110, while blurring out the regions below the head and shoulder region 415. If the far field focused images 508 captures a human object of interest 110 (e.g., a person), then the image sensor 105 can blur head and shoulder region 415 of the object of interest 110, while focusing on the regions below the head and shoulder region 415.

At 510, the object detection component 205 can begin object detection on an image. For example, the object detection component 205 can begin to perform object detection in accordance with one or more of the approaches described herein. The object detection component 205 can locate one or more people in the near field image 506. In an aspect, the object detection component 205 can be used to search each area defined by a bounding box in each frame to perform person detection. The object detection technique was originally designed to detect objects in an image, so that the entire near field image 506 is searched and processed.

At 512, the object detection component 205 detects whether there is a person in the surroundings of the image sensor 105, based on the captured near field image 506. In at least one aspect, the object detection component 205 detects whether there is a head and shoulders region in the near field image 506 using a conventional object detection algorithm. If the head and shoulders region 415 is detected in the near field image 506, the object detection component 205 determines that the person is present in the surroundings of the image sensor 105. Otherwise, if no head and shoulder region 415 is detected, the object detection component 205 determines that no person is present in the surroundings of the image sensor 105. Since the image 506 is a near field image, the object detection component 205 is most likely to detect the objects which are bigger or longer in size in the top view (such as, the adult 405 in FIG. 4). It should be noted, the objects located below a certain depth (such as, the child 410 in FIG. 4) can remain undetected by the detection component 205 in the near field image 506 due to being in the unfocused area.

In response to determining that there is no person in the surroundings of the image sensor 105 (step 512, "No" branch), the object detection component 205 can discard the analyzed image frame (step 513). In response to determining that there is a person in the surroundings of the image sensor 105 (step 512, "Yes" branch), the object detection component 205 can send positional information of the detected object within the analyzed image frame to the object masking component 210. Furthermore, in response to determining that there is a person in the surroundings of the image sensor 105 (step 512, "Yes" branch), the object masking component 210 can generate a mask for the detected object (such as, the adult 405 in FIG. 4) based on positional information of the object which was detected by the object detection component 205 (step 514). In an aspect, the object masking component 210 is further configured to perform an operation of masking a region corresponding to the detected object from near field image 506 such that only features representing non detected objects remain in the near field image 506. In other words, at step 514 one or more objects detected by the object detection component 205 then can be masked to avoid multiple detections of the same object. In an aspect, the object masking component 210 can be responsible for associating detected objects across frames to achieve consistent masking throughout a scene. In an aspect, the object masking component 210 can receive the segmentation data from the object detection component 205, can and identify and mask objects and follow the masked objects across the frames. In an aspect, the object masking component 210 can mask the previously detected objects using conventional instance segmentation algorithms.

In an aspect, the object detection component 205 can maintain a dictionary of prior detection objects and can reject the detected objects if these objects have been previously detected in the near field image 506, for example. Many objects can have sparse representations using some dictionary, including a standard dictionary such as wavelets or curvelets, or a custom dictionary (for people, for example).

At step 516, the object masking component 210 can register the generated mask in order to transfer the masked detected object regions from the near-field image 506 to the far-field image 508. In an aspect, the object masking component 210 can utilize either a rigid mask registration technique or an elastic mask registration technique. The rigid mask registration technique is useful for image capture sequences where the shape of the detected object (ROI) does not change but only its pose in the image changes. For more complex image capture procedures, however, the shape of the ROI may also change between the near-field image 506 and the far-field image 508. For example, the ROI for face images of the detected object (such as, the adult 405 in FIG. 4) can change from the near-field image 506 to the far-field image 508 due to a change in facial expression, muscle movements, etc. The ROI may deform freely in any direction. For these cases, elastic registration is more appropriate to model the morphing of the ROI. Elastic registration relies on finding a set of corresponding points in the reference (near-field image 506) and target (far-field image 508) images.

At step 518, the object detection component 205 can use the masked far-field image 508 to detect other objects in the scene. Step 518 may be performed similarly to the step 510 described above.

At step 520, the object tracking component 215 can generate multiple bounding boxes corresponding to the objects detected by the object detection component 205, such as bounding boxes 420 and 425 shown in FIG. 4. In an aspect, the multiple bounding boxes 420, 425 may include a bounding box proposal network designed and trained to output N boxes. For each of the N boxes, it has a single output to predict the confidence an object of interest (the detected object) is in the box (e.g., a value in the range from 0 to 1). These confidence outputs can be trained with a logistic loss function. Additionally, for each of the N boxes, the network can have four location outputs to estimate the bounding box (minimum and maximum x and y coordinates). The coordinates range from 0 (left or top of the square input image) to 1 (right or bottom of the square input image). Each of the confidence and location pairs can be trained to handle only a certain window (or portion) of the corresponding image.

At step 522, the object tracking component 215 can count the detected objects using the multiple bounding boxes in each image (both the near-field image 506 and the far-field image 508), accumulating multiple frames (images) of object detections, creating tracks based on a batch of object detections over multiple frames and associating tracks over consecutive batches. For example, frames with object detections can be stored in a database (e.g., database 220) or buffer and processed in batches by the object tracking component 215. Advantageously, this approach enables accurate detection and count of substantially all objects in the given scene.

Figure 6:
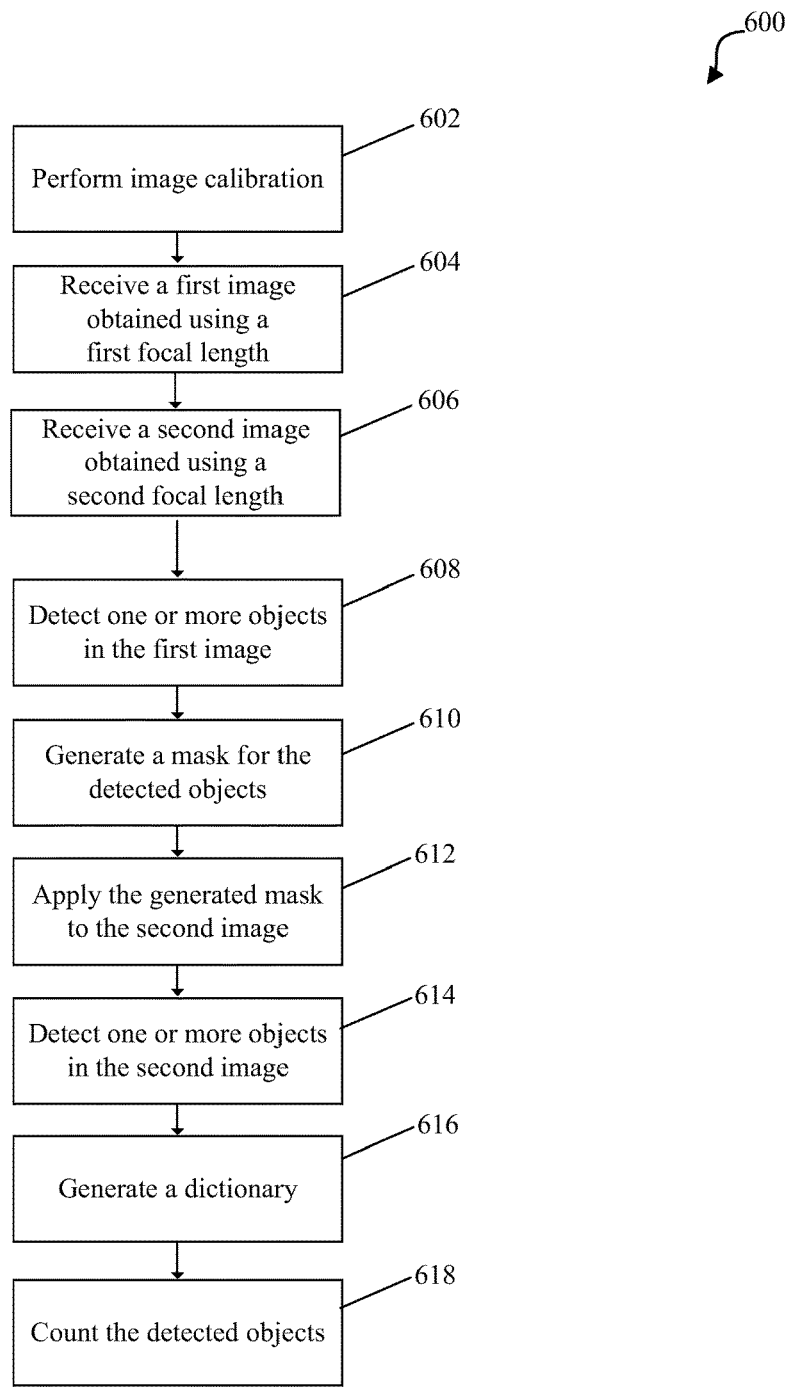
FIG. 6 is an example of a flow diagram of a method for detecting an object in an image, according to an aspect of the present disclosure.

FIG. 6 is an example of a flow diagram of a method for detecting an object in an image, according to an aspect of the present disclosure. FIGS. 1-5 may be referenced in combination with the flowchart of FIG. 5. To start, method 600 includes one or more image sensors 105 such as a video camera, surveillance camera, still image camera, digital camera, or other computing device (e.g., laptop, tablet, personal digital assistant, or smartphone) with video or still image creation or recording capability. In an aspect, the image sensor 105 is configured to perform a focus bracket function. Specifically, in the focus bracket function, an image capturing is performed with a focus lens being moved from a near-field focus toward a far-field focus.

At step 602, the data processing 120 can perform image calibration. Image calibration defines the relationship between an image and the scene that the image depicts. Calibration characterizes the photometric and geometric properties of the image sensor 105, that define, respectively how pixels of the image sensor 105 report color and intensity of the scene, and where scene elements appear on the image. Most common calibration approaches start with an image of an object with known 3-D geometry, or several images of an object with known 2-D geometry, find correspondences between points on the object and points in the image, and use these to solve for the image sensor geometry. Calibration allows to exploit the depth of the image for adjusting focus of the image sensor 105. In an aspect, the data processing system 120 may configure the image sensor 105 to selectively transition between the near field focus image and the far field focus image.

At step 604, the data processing system 120 can receive a first image from the image sensor 105 obtained using a first focal length. The first image can be a near field focus image. During focus bracketing 504, the f-number of the lens is usually set to be small at the time of near field image capturing. This setting makes each near field image 506 have a shallow depth of field but makes the amount of incident light for forming the image large, yielding a sharp image having relatively less image capturing noise than a far field image 508 captured with a large f-number.

At step 606, the data processing system 120 can receive a second image from the image sensor 105 obtained using a second focal length. The second image can be a far field focus image 508.

At step 608, the object detection component 205 of the data processing system 120 can detect one or more objects in the near field image. The detection techniques that can be used are what are known as the Histogram of Oriented Gradients (HOG) for detection of objects, using deep learned techniques, or other suitable techniques or combinations of techniques. In an aspect, the detection component 205 may utilize a detection threshold. The detection threshold may be adjusted depending on the size of the object.

At step 610, the object masking component 210 can generate a mask for the detected object (such as, the adult 405 in FIG. 4) based on positional information of the object which was detected by the object detection component 205. In an aspect, the object masking component 210 is further configured to perform an operation of masking a region corresponding to the detected object from near field image 506 such that only features representing non detected objects remain in the near field image 506. In other words, at step 610 one or more objects detected by the object detection component 205 then can be masked to avoid multiple detections of the same object.

In an aspect, at 612, the object masking component 210 can apply the one or more generated object masks to the second image (far field image). The object masking component 210 can register the generated mask in order to transfer the masked detected object regions from the near-field image 506 to the far-field image 508.

In an aspect, at step 614, the object detection component 205 of the data processing system 120 can detect one or more objects in the far field image 508 in accordance with one or more of the object detection approaches described herein. In an aspect, the object detection component 205 can be used to search each area defined by a bounding box in each frame to perform object detection.

At step 616, the object detection component 205 can generate a dictionary based on detection results of steps 608 and 614. During subsequent object detections, the object detection component 205 can reject the detected objects using the dictionary if these objects have been previously detected in the near field image 506, for example.

At step 618, the object tracking component 215 can count the detected objects using multiple bounding boxes 420, 425 in each image (both the near-field image 506 and the far-field image 508), accumulating multiple frames (images) of object detections, creating tracks based on a batch of object detections over multiple frames and associating tracks over consecutive batches. For example, frames with object detections can be stored in a database (e.g., database 220). Advantageously, this approach enables accurate detection and count of substantially all objects in the given scene.

In other words, the method 600 includes a method for detecting an object in an image. One aspect of the method includes receiving a first image from an image sensor. The first image is obtained by the image sensor using a first focal length. A second image is received from the image sensor. The second image is obtained by the image sensor using a second focal length. One or more objects are detected in the first image and the second image. The one or more objects detected in the first image are combined with the one or more objects detected in the second image.

In one or any combination of these aspects, the first image includes a near field focus image and the second image includes a far field focus image.

In one or any combination of these aspects, the method further includes generating one or more object masks for each of the one or more objects detected in the first image. The one or more object masks identify one or more regions of the first image that correspond to the one or more objects detected in the first image.

In one or any combination of these aspects, the method further includes applying the one or more generated object masks to the second image.

In one or any combination of these aspects, the method further includes, prior to obtaining the first image and the second image, configuring the image sensor to selectively transition between the near field focus image and the far field focus image.

In one or any combination of these aspects, the image sensor is positioned to obtain a top view of the image scene.

In one or any combination of these aspects, each of the one or more objects detected in the first image and each of the one or more objects detected in the second image is a person.

In one or any combination of these aspects, the one or more regions correspond to head and shoulders of the person.

In one or any combination of these aspects, the method further includes generating a dictionary based on detection results in the first image and the second image.

In one or any combination of these aspects, the method further includes saving information about the one or more objects detected in the first region and the one or more objects detected in the second region as metadata.

Figure 7:
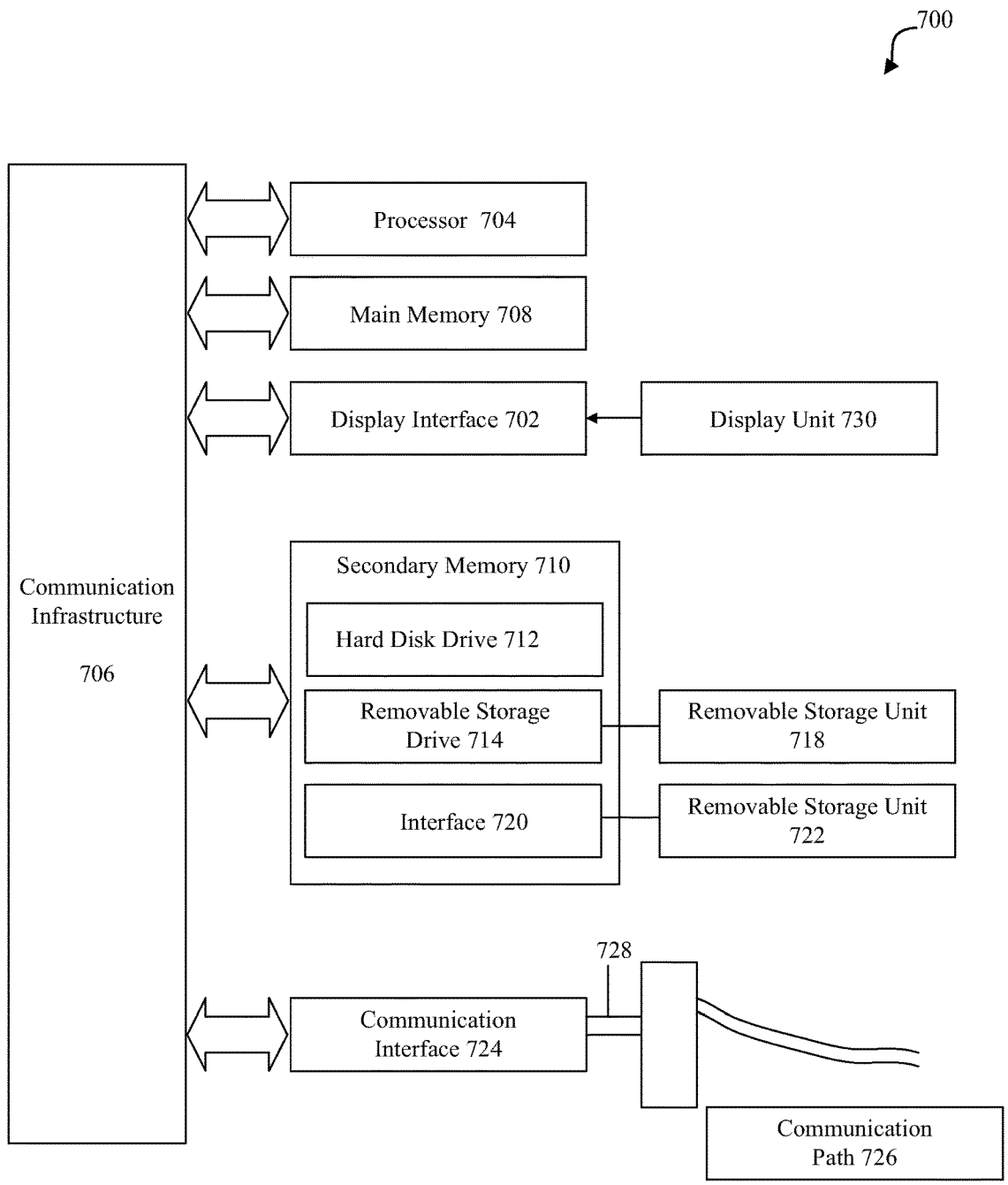
FIG. 7 is a block diagram of various hardware components and other features of a computer system that may enable object detection in accordance with aspects of the present disclosure.

FIG. 7 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 700 is shown in FIG. 7.

Computer system 700 includes one or more processors, such as processor 704. The processor 704 is connected to a communication infrastructure 706 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Processor 704, or any other "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

Communication infrastructure 706, such as a bus (or any other use of "bus" herein), refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a bus that interconnects components inside a access control system using protocols, such as Controller Area network (CAN), Local Interconnect Network (LIN), Wiegand and Open Supervised Device Protocol (OSDP) among others.

Further, the connection between components of computer system 700, or any other type of connection between computer-related components described herein may be referred to an operable connection, and may include a connection by which entities are operably connected, such that signals, physical communications, and/or logical communications may be sent and/or received. An operable connection may include a physical interface, a data interface and/or an electrical interface.

Computer system 700 may include a display interface 702 that forwards graphics, text, and other data from the communication infrastructure 706 (or from a frame buffer not shown) for display on a display unit 730. Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc., which is read by and written to removable storage drive 714. As will be appreciated, the removable storage unit 718 includes a computer usable storage medium having stored therein computer software and/or data.

In alternative aspects, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

It should be understood that a memory, as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728, which may be electronic, electromagnetic, optical or other signals capable of being received by communications interface 724. These signals 728 are provided to communications interface 724 via a communications path (e.g., channel) 726. This path 726 carries signals 728 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 714, a hard disk installed in hard disk drive 712, and signals 728. These computer program products provide software to the computer system 700. Aspects of the disclosure are directed to such computer program products.

Computer programs (also referred to as computer control logic) are stored in main memory 708 and/or secondary memory 710. Computer programs may also be received via communications interface 724. Such computer programs, when executed, enable the computer system 700 to perform various features in accordance with aspects of the present disclosure, as discussed herein. In particular, the computer programs, when executed, enable the processor 704 to perform such features. Accordingly, such computer programs represent controllers of the computer system 700.

In variations where aspects of the disclosure are implemented using software, the software may be stored in a computer program product and loaded into computer system 700 using removable storage drive 714, hard drive 712, or communications interface 720. The control logic (software), when executed by the processor 704, causes the processor 704 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method comprising:
   receiving, by a processor, a first image from an image sensor, wherein the first image is obtained by the image sensor using a first focal length;
   receiving, by the processor, a second image from the image sensor, wherein the second image is obtained by the image sensor using a second focal length that is different than the first focal length;
   detecting, by the processor, one or more objects in the first image;
   generating, by the processor, a third image by applying one or more object masks to the second image, wherein the one or more object masks identify one or more regions of the first image that correspond to the one or more first objects detected in the first image;
   detecting, by the processor, one or more second objects in the third image; and
   combining, by the processor, the one or more objects detected in the first image with the one or more objects detected in the third image.

2. The method of claim 1, wherein the first image comprises a near field focus image and the second image comprises a far field focus image.

3. The method of claim 2, further comprising, prior to obtaining the first image and the second image, configuring, by the processor, the image sensor to selectively transition between the near field focus image and the far field focus image.

4. The method of claim 1, wherein the image sensor is positioned to obtain a top view of an image scene.

5. The method of claim 4, wherein each of the one or more objects detected in the first image and each of the one or more second objects detected in the third image is a person.

6. The method of claim 5, wherein the one or more regions correspond to head and shoulders of the person.

7. The method of claim 1, further comprising generating, by the processor, a dictionary based on detection results in the first image and the third image.

8. The method of claim 1, further comprising saving, by the processor, information about the one or more objects detected in the first region and the one or more objects detected in the third region as metadata.

9. A system comprising:
   a hardware processor configured to:
   receive a first image from an image sensor, wherein the first image is obtained by the image sensor using a first focal length;
   receive a second image from the image sensor, wherein the second image is obtained by the image sensor using a second focal length that is different than the first focal length;
   detect one or more objects in the first image;
   generate a third image by applying one or more object masks to the second image, wherein the one or more object masks identify one or more regions of the first image that corresponds to the one or more first objects detected in the first image;
   detect one or more objects in the third image; and
   combine the one or more objects detected in the first image with the one or more second objects detected in the third image.

10. The system of claim 9, wherein the first image comprises a near field focus image and the second image comprises a far field focus image.

11. The system of claim 10, wherein the hardware processor is further configured to configure, prior to obtaining the first image and the second image, the image sensor to selectively transition between the near field focus image and the far field focus image.

12. The system of claim 9, wherein the image sensor is positioned to obtain a top view of an image scene.

13. The system of claim 12, wherein each of the one or more first objects detected in the first image and each of the one or more objects detected in the third image is a person.

14. The system of claim 13, wherein the one or more regions correspond to head and shoulders of the person.

15. The system of claim 9, wherein the hardware processor is further configured to generate a dictionary based on detection results in the first image and the third image.

16. The system of claim 9, wherein the hardware processor is further configured to save information about the one or more first objects detected in the first image and the one or more second objects detected in the third image as metadata.

17. The system of claim 9, wherein the one or more object masks identify the one or more regions of the first image that correspond to the one or more first objects that are in-focus at the first focal length in the first image.

18. The system of claim 17, wherein to generate the third image, the hardware processor is configured to apply the one or more object masks to mask out the one or more first objects as detected at the second focal length in the second image.

19. The method of claim 1, wherein the one or more object masks identify the one or more regions of the first image that correspond to the one or more first objects that are in-focus at the first focal length in the first image.

20. The method of claim 19, wherein generating the third image comprises applying the one or more object masks to mask out the one or more first objects as detected at the second focal length in the second image.

\* \* \* \* \*